US008878509B2

(12) United States Patent  
Labbe (10) Patent No.: US 8,878,509 B2  
(45) Date of Patent: Nov. 4, 2014

(54) CURRENT-MODE CONTROLLER FOR STEP-DOWN (BUCK) CONVERTER

(71) Applicant: ST-Ericsson SA, Plan-les-Ouates (CH)

(72) Inventor: Benoît Labbe, Grenoble (FR)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/935,630

(22) Filed: Jul. 5, 2013

(65) Prior Publication Data

US 2014/0049239 A1    Feb. 20, 2014

Related U.S. Application Data

(60) Provisional application No. 61/684,225, filed on Aug. 17, 2012.

(51) Int. Cl.
  *G05F 1/40* (2006.01)
  *H02M 3/156* (2006.01)
  *H02M 1/00* (2006.01)

(52) U.S. Cl.
  CPC ...... *H02M 3/156* (2013.01); *H02M 2001/0009* (2013.01); *H02M 2001/0025* (2013.01)
  USPC ........................................................ 323/285

(58) Field of Classification Search
  USPC .................. 323/282, 283, 284, 285, 267, 351
  See application file for complete search history.

(56) References Cited

U.S. PATENT DOCUMENTS 5,847,554 A * 12/1998 Wilcox et al. ................. 323/282  
5,982,160 A   11/1999 Walters et al.

(Continued)

FOREIGN PATENT DOCUMENTS

CN    102364855 A    2/2012  
DE    10043482 A1    3/2002

(Continued)

OTHER PUBLICATIONS

Hua, L., et al., "Design Considerations for Small Signal Modeling of DC-DC Converters Using Inductor DCR Current Sensing Under Time Constants Mismatch Conditions", Power Electronics Specialists Conference, Jun. 17, 2007, pp. 2182-2188, IEEE, Orlando, FL.

(Continued)

*Primary Examiner* — Adolf Berhane  
(74) *Attorney, Agent, or Firm* — Coats & Bennett, PLLC (57) ABSTRACT

A current-mode regulator relies on indirect current measurement to facilitate slope compensation used to stabilize the operation of a buck converter. The current-mode regulator comprises an inductor, a switching network, and a controller. The inductor delivers an output current to a load. The switching network selectively connects the inductor input to an input voltage or a second voltage. The regulator controls the switching network. An inner loop control circuit of the regulator comprises the switching network, a current measuring circuit, a slope circuit, a comparator, and a switching controller. The current measuring circuit comprises a passive network connected to the inductor input and operative to indicate an inductor current as a measurement voltage. The slope circuit applies a time-varying voltage having a positive slope to the measurement voltage. The comparator compares a slope compensated measurement voltage to the control voltage. The switching regulator controls the switching network in response to the output of the comparator.

25 Claims, 6 Drawing Sheets

(56) References Cited

U.S. PATENT DOCUMENTS

| | | | |
|---|---|---|---|
| 6,127,815 A * | 10/2000 | Wilcox | 323/282 |
| 6,222,356 B1 | 4/2001 | Taghizadeh-Kaschani | |
| 6,828,766 B2 * | 12/2004 | Corva et al. | 323/284 |
| 6,909,268 B2 | 6/2005 | Taghizadeh-Kaschani | |
| 6,965,223 B1 * | 11/2005 | MacLean et al. | 323/284 |
| 7,358,706 B2 * | 4/2008 | Lys | 323/222 |
| 7,649,346 B2 * | 1/2010 | Sohma | 323/283 |
| 7,936,160 B1 * | 5/2011 | Sheehan | 323/285 |
| 7,965,070 B2 * | 6/2011 | Nakahashi | 323/285 |
| 8,258,765 B2 * | 9/2012 | Nishida | 323/277 |
| 8,786,268 B2 * | 7/2014 | Li et al. | 323/285 |
| 2006/0145675 A1 | 7/2006 | Lee et al. | |
| 2010/0253309 A1 | 10/2010 | Xi et al. | |
| 2011/0050185 A1 | 3/2011 | Notman et al. | |
| 2011/0062932 A1 | 3/2011 | Hawkes | |
| 2013/0002223 A1 | 1/2013 | Xi | |

FOREIGN PATENT DOCUMENTS

| | | | | |
|---|---|---|---|---|
| EP | 1850468 A2 | | 10/2007 | |
| EP | 2424097 A2 | | 2/2012 | |
| EP | 2457317 A2 | | 5/2012 | |
| WO | 2011010143 A2 | | 1/2011 | |
| WO | WO2014027085 | * | 2/2014 | H02M 3/156 |

OTHER PUBLICATIONS

Castilla, M., et al. "Simple Low-Cost Hysteretic Controller for Single-Phase Synchronous Buck Converters", IEEE Transactions on Power Electronics, Jul. 1, 2007, pp. 1232-1241,vol. 22, No. 4, IEEE.

Hartman, M., "Inside Current-Mode Control", Power Designer, Expert tips, tricks, and techniques for powerful designs, Jul. 26, 2010, pp. 1-8, No. 106, National Semiconductor, CA, US.

Unitrode, "Modelling, Analysis and Compensation of the Current-Mode Converter", Application Note, U-97, Sep. 1, 1999, pp. 3-43-3-48, Texas Instruments, [Retrieved on Jul. 1, 2013], retrieved from Internet:www.ti.com/lit/an/slua101/slua101.pdf.

Mai, Y. Y., et al., "A Constant Frequency Output -Ripple-Voltage-Based Buck Converter Without Using LArge ESR Capacitor", IEEE Transactions on Circuits and Systems II: Express Briefs, Aug. 1, 2008, pp. 748-752 ,vol. 55 , Issue: 8, IEEE Circuits and Systems Society.

Ni, Y., et al., "A Fixed-frequency Sliding Mode Controller for Buck Converter in Continuous Conduction Mode", Twenty-Fourth Annual IEEE Applied Power Electronics Conference and Exposition, Feb. 15, 2009, 794-798, IEEE.

Redl, R., et al., "Ripple-based control of switching regulators—an overview", IEEE Transactions on Power Electronics, Dec. 1, 2009, pp. 2669-2680, vol. 24 ,Issue: 12, IEEE Power Electronics Society.

Hua, L., et al., "Design considerations for small signal modeling of dc-dc converters using inductor dcr current sensing under time constants mismatch conditions", IEEE 38th Annual Power Electronics Specialists Conference, Jun. 17, 2007, pp. 2182-2188, IEEE, US.

* cited by examiner

CURRENT-MODE CONTROLLER FOR STEP-DOWN (BUCK) CONVERTER

This application claims priority to Provisional U.S. Patent Application 61/684,225 filed 17 Aug. 2012, which is incorporated herein by reference.

BACKGROUND

Embedded systems requiring high efficiency, high output current, and low production volume often use step down DC-DC converters, also known as buck converters. A buck converter generally employs Pulse Width Modulation (PWM) control, e.g., a PWM voltage-mode controller or a PWM current-mode controller.

Voltage-mode controllers use a Proportional Integral Derivative (PID)-type continuous transfer function, as compared to a triangle signal, to produce a modulated signal (the PWM signal). Because the PID-type function only uses the output voltage, the output filter forms a second order low pass filter with two poles. After adding an integral action to reduce steady state output error, the open-loop transfer function becomes a three-pole function. Whatever the designer does, however, the DC-DC converter is unstable without two correction zeroes. The compensation scheme required to provide such correction zeroes is highly sensitive to process variations and require a complex proper calibration system.

Current-mode controllers regulate the current supplied to a power inductor to regulate the output voltage. A current-mode controller operates using two loops: an internal current loop, which regulates the inductor current, and an outer voltage loop. Because the internal current loop forms a high bandwidth loop, the inductor may be modeled as a current source, such that the power-stage's transfer function is a first order function with a single pole defined by the output capacitor and the resistive load. The compensation required to stabilize the current-mode controller is much less complex than that required for the voltage-mode controller, and the overall performance is much better. However, current-mode controllers require measuring the inductor's current. Further, current-mode controllers may be unstable in some circumstances, e.g., when the required duty cycle is higher than 50% when the inductor's peak current is regulated, or when the required duty cycle is lower than 50% when the inductor's valley current is regulated. Current-mode controllers also have a tendency towards subharmonic oscillation, non-ideal loop responses, and an increased sensitivity to noise. Slope compensation, where a small slope is added to the measured inductor current, may be employed to overcome these difficulties.

Conventional slope compensation, however, typically increases the complexity and cost of the current-mode controller. For example, conventional slope compensation requires complex and sensitive measurement circuitry to measure the inductor current, which often requires a large biasing current. Also, commonly used instantaneous measurement circuits are not precise enough to be used in a regulated loop and do not provide a sufficient bandwidth for small duty cycles. Further, slope compensation typically results in a lower efficiency due to the required voltage drop for a direct current measurement. Also, some conventional slope-compensation circuits require a slope generator, e.g., the saw-tooth generator used for the PWM modulator, and a fast adder to add the inductor current measurement and the generated slope. When considering a 3.2 MHz switching regulator, which is a common switching frequency, the slope generator is not particularly more complex than one for voltage-mode control. The adder, however, must have a bandwidth much higher than the switching frequency, e.g., greater than ten times the switching frequency. In addition, all of the components required for this complex circuitry require a large silicon area. Thus, there remains a need for a stable current-mode controller employing less complex, but still accurate slope compensation.

SUMMARY

The current-mode regulator disclosed and claimed herein relies on an indirect current measurement to facilitate the slope compensation. In one exemplary embodiment, a current-mode regulator comprises a power inductor, a switching network, and a controller. The power inductor has an input and an output, and is operative to deliver an output current from the power inductor output to a load. The switching network is operative to selectively connect the power inductor input to an input voltage or a second voltage. The controller is operative to control the switching network, and comprises an inner loop control circuit comprising the switching network, a current measuring circuit, a slope circuit, a comparator, and a switching controller. The current measuring circuit comprises a passive network connected to the power inductor input and operative to indicate a power inductor current as a measurement voltage. The slope circuit is connected between the current measuring circuit and the output and is operative to apply a time-varying voltage having a positive slope to the measurement voltage to generate a slope compensation measurement voltage. The comparator is operative to compare the slope compensated measurement voltage to a control voltage. The switching controller is operative to control the switching network in response to the output of the comparator.

In another exemplary embodiment, a current-mode regulator for a buck converter comprises an inductor and an inner current loop circuit. The inductor has an inductor current based on the inductance of the inductor and an inductor voltage applied across the inductor. The inner current loop circuit is operatively connected to an input node of the inductor and an output node of the inductor, and is configured to regulate the inductor current based on a control voltage, an indirect measurement of the inductor current, and a slope compensation voltage. The inner current loop comprises a slope circuit is operatively connected to the output node of the inductor at an output node of the current-mode regulator, and is configured to generate the slope compensation voltage based on the inductor voltage. To that end, the slope circuit comprises a slope capacitor and a switch. The slope capacitor is operatively connected to the output node of the inductor, and is configured to generate the slope compensation voltage. The switch is operatively connected in parallel with the slope capacitor, and is configured to selectively actuate responsive to the inductor voltage. The switch actuates such that the switch closes when the inductor voltage is at a first voltage to discharge the slope capacitor, and the switch opens when the inductor voltage is at a second voltage different from the first voltage to charge the slope capacitor to generate the slope compensation voltage having a positive slope based on the capacitor.

An exemplary method of controlling a buck converter using current-mode control, where the current-mode control regulates an inductor current of an inductor, comprises generating an output voltage at an output end of the inductor based on the inductor current, the inductance of the inductor, and an inductor voltage applied across the inductor. The method further comprises generating a slope compensation voltage based on the inductor voltage, and regulating the inductor current in an inner current loop based on a control voltage, an indirect measurement of the inductor current, and the slope compensation voltage. Generating the slope compensation voltage comprises closing a switch operatively connected in parallel with a slope compensation capacitor when the inductor voltage is at a first voltage to discharge the slope capacitor, and opening the switch when the inductor voltage is at a second voltage different from the first voltage to charge the slope capacitor to generate the slope compensation voltage having a positive slope based on the slope capacitor.

DETAILED DESCRIPTION

Figure 1:
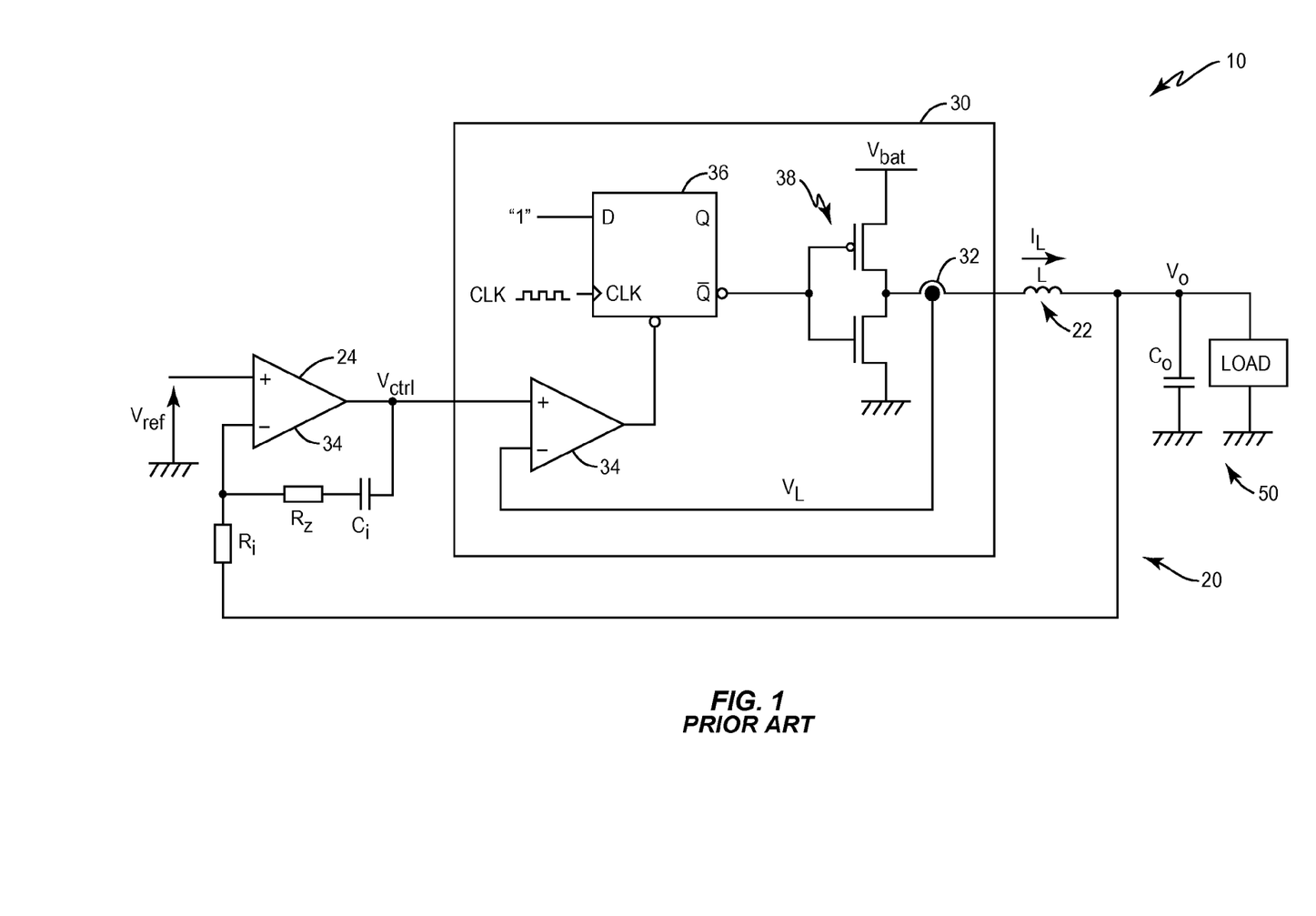
FIG. 1 shows a conventional current-mode controller without slope compensation.

FIG. 1 shows a conventional current-mode controller 10 for a buck converter (also known as a step-down or DC-DC voltage regulator). The current-mode controller 10, which also may be referred to herein as a current-mode regulator, includes an outer voltage loop 20, including an inductor 22, and an internal current loop 30, which regulates the inductor's current. Internal current loop 30 includes a current measurement circuit 32 in line with the inductor 22, a comparator 34, a switching controller 36, and a switching network 38. The current measurement circuit 32 measures the inductor current $I_L$ directly, and provides the measured current in the form of a measured voltage $V_L$ to the comparator 34. Based on a comparison between $V_L$ and an input control voltage $V_{ctrl}$, the switching controller 36 controls the switching network 38 to selectively connect the inductor 22 to an input supply voltage $V_{bat}$ or to ground.

Outer voltage loop 20 includes the inductor 22 and a compensation circuit 24. The outer voltage loop 20 generates a regulator output voltage $V_o$ in the load 50 based on the inductor current $I_L$. The compensation circuit 24 generates the control voltage $V_{ctrl}$ applied to the inner current loop 30 based on $V_{ref}$, and optionally based on $V_o$. For example, the compensation circuit 24 may generate the control voltage $V_{ctrl}$ according to:

$$V_{ctrl}=k_p(V_{ref}-V_o)+k_d\partial(V_{ref}-V_o)+k_i\int(V_{ref}-V_o), \quad (1)$$

where $k_p$, $k_d$, and $k_i$ represent arbitrary defined regulator parameters. The operations of compensation circuit 22 are well known in the art, and thus are not discussed further herein.

Figure 2:
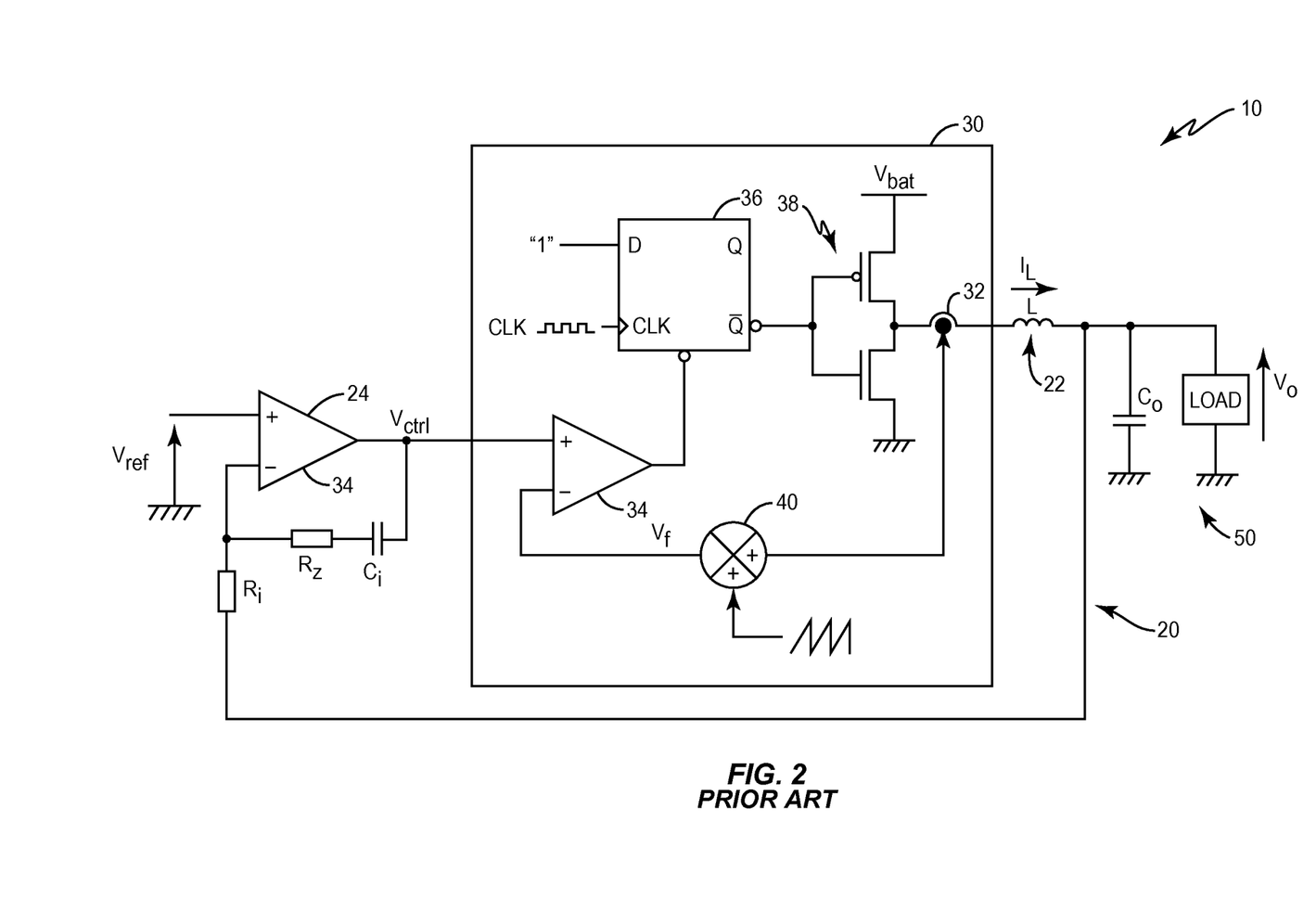
FIG. 2 shows a conventional current-mode controller with conventional slope compensation.

The current-mode controller 10 of FIG. 1 is unstable for duty cycles exceeding 50% when the inductor's peak current is regulated, or for duty cycles less than 50% when the inductor's valley current is regulated. To overcome this problem, slope compensation may be added to the measured inductor current, as shown in FIG. 2. To that end, an adder 40 may be inserted between the comparator 34 and the current measurement node 32 to enable a fixed slope, represented in FIG. 2 by the sawtooth signal, to be directly added to the measured inductor current/voltage to generate a slope compensated measurement voltage $V_f$ applied to the input of the comparator 34.

While conventional slope compensation techniques, such as the one shown in FIG. 2, resolve many problems associated with current-mode controllers, conventional slope compensation techniques are not suitable for all applications. For example, slope compensation requires complex and sensitive measurement circuitry to measure the inductor current, which often requires a large biasing current. Also, commonly used instantaneous measurement circuits are not precise enough to be used in a regulated loop and do not provide a sufficient bandwidth for small duty cycles. Further, the current measurement circuit 32 causes a voltage drop at the input to the inductor 22, and therefore, impacts the efficiency of the associated buck converter. Typical regulators also have high switching frequencies, e.g., 3.2 MHz. In order to add the desired slope compensation, such regulators require a high speed adder 40 having a bandwidth significantly greater, e.g., ten times greater, than the switching frequency. In addition, all of the components required for this solution require a large silicon area. Thus, conventional solutions are not always suitable for high speed regulators and/or electronic devices having limited silicon area.

Figure 3:
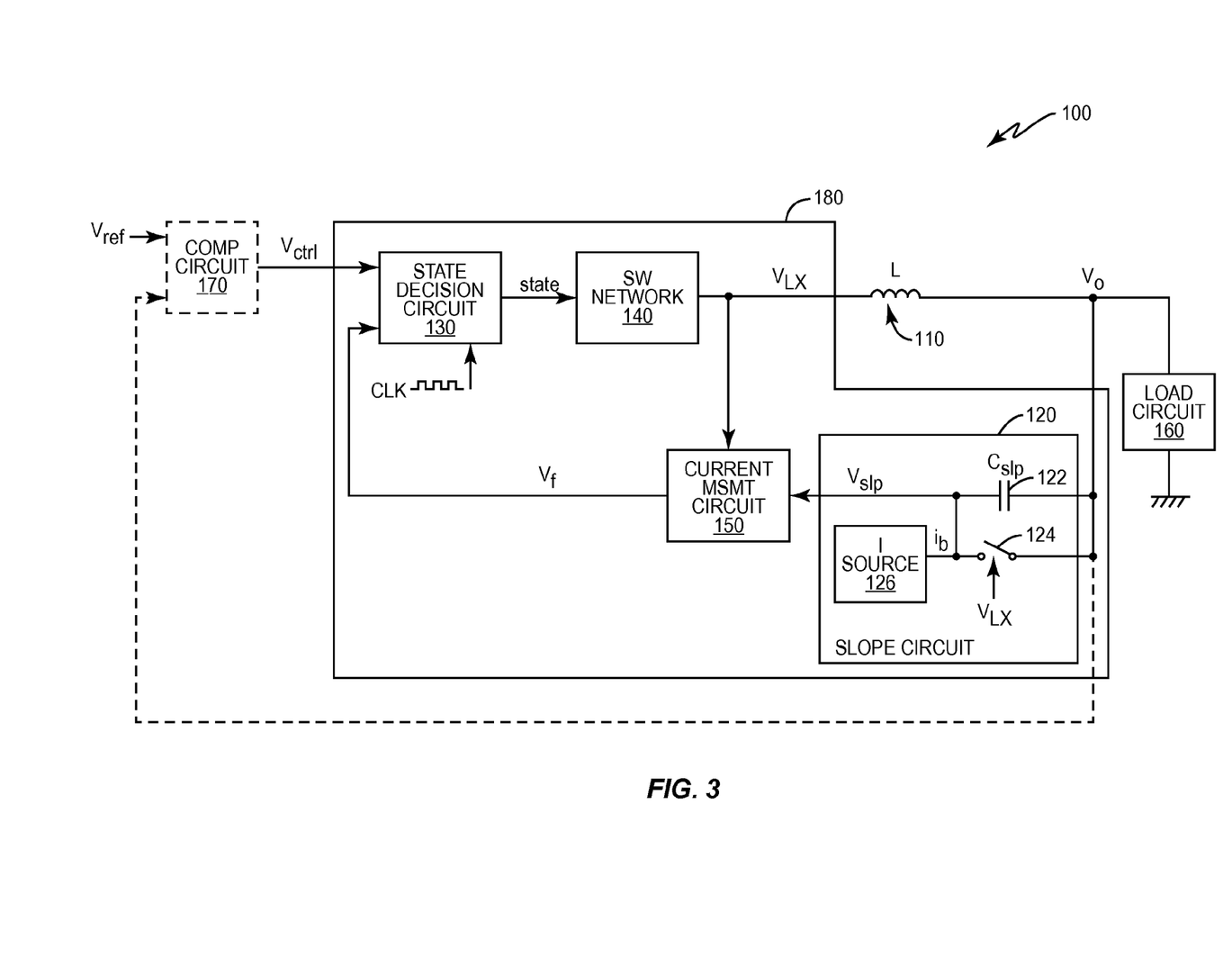
FIG. 3 shows a block diagram for a current-mode regulator for a buck converter according to one exemplary embodiment.

FIG. 3 shows an exemplary current-mode regulator 100 providing current-mode control according to one exemplary embodiment. The illustrated solution provides the requisite slope compensation without incurring the above-noted problems associated with conventional solutions. To that end, the solution of FIG. 3 applies slope compensation to an inductor current indirectly measured by a current measurement circuit in the feedback portion of the inner current loop 180.

Current-mode regulator 100 comprises an inductor 110, e.g., a power inductor, having an inductance L operative to generate an instantaneous inductor current $I_L$, and to deliver an average inductor current $I_{LO}$ and output voltage $V_o$ to a load circuit 160. The inner current loop 180 includes a slope circuit 120, a state decision circuit 130, a switching network 140, and a current measurement circuit 150. The state decision circuit 130 controls the switching network 140 to connect the inductor to an input voltage, e.g., $V_{bat}$, or a second voltage, e.g., ground, responsive to a control voltage and a slope compensated measurement voltage $V_f$ input to the state decision circuit 130. While FIG. 3 shows that the switching network 140 connects the inductor to $V_{bat}$ or ground, it will be appreciated that other voltages may be used where the input voltage is greater than the second voltage. For example, the input voltage could be 0V, and the second voltage could be −5V. The current measurement circuit 150 indirectly measures the inductor current $I_L$ as described further below, where the indirect current measurement $I_L'$ is assumed to approximately equal the voltage drop across the inductor $V_L$. Because the current measurement circuit 150 is not connected in series with the inductor 110, it does not negatively impact the efficiency of the current-mode regulator 100.

The slope circuit 120 connects between an output of the inductor 110 and an input to the current measurement circuit 150 to apply a time-varying voltage $V_{slp}$ having a positive slope to the measurement voltage $V_L$ generated by the current measurement circuit 150 to generate the slope compensated measurement voltage $V_f$. The applied slope compensation increases the stability of the regulator by increasing a slope of $V_L$, e.g., when the inductor 110 is connected to the input voltage $V_{bat}$. In the illustrated embodiment, the slope circuit 120 avoids the adder 40 associated with conventional solutions by using a slope capacitor 122 connected in parallel with a switch 124. The voltage $V_{LX}$ at the input to the inductor 110 (or optionally the inductor voltage $V_L$) controls switch 124 such that the switch closes when $V_{LX}$ is at a first voltage, e.g., ground, to discharge the capacitor 122. The switch opens when $V_{LX}$ changes to a second voltage, e.g., $V_{bat}$, to charge the capacitor 122. As a result, the capacitor 122 generates the slope compensated measurement voltage $V_{slp}$ at the output of the slope circuit 120. In some embodiments, the slope circuit 120 may further include a current source 126 coupled to the slope capacitor 122 to inject additional current $i_b$ into the slope capacitor 122 to increase the slope of the slope compensation voltage $V_{slp}$ when switch 124 is open.

A compensation circuit 170, which is part of an outer voltage loop, may be used to generate the control voltage $V_{ctrl}$ input to the state decision circuit 130 based on a reference voltage $V_{ref}$, and optionally based on the output voltage $V_o$, as previously discussed. While FIG. 3 shows a compensation circuit 170, the current-mode regulator 100 does not require one because operation without voltage compensation may also be implemented. In this case, the reference voltage $V_{ref}$ is used as the control voltage, and is connected directly to the state decision circuit 130.

Figure 4:
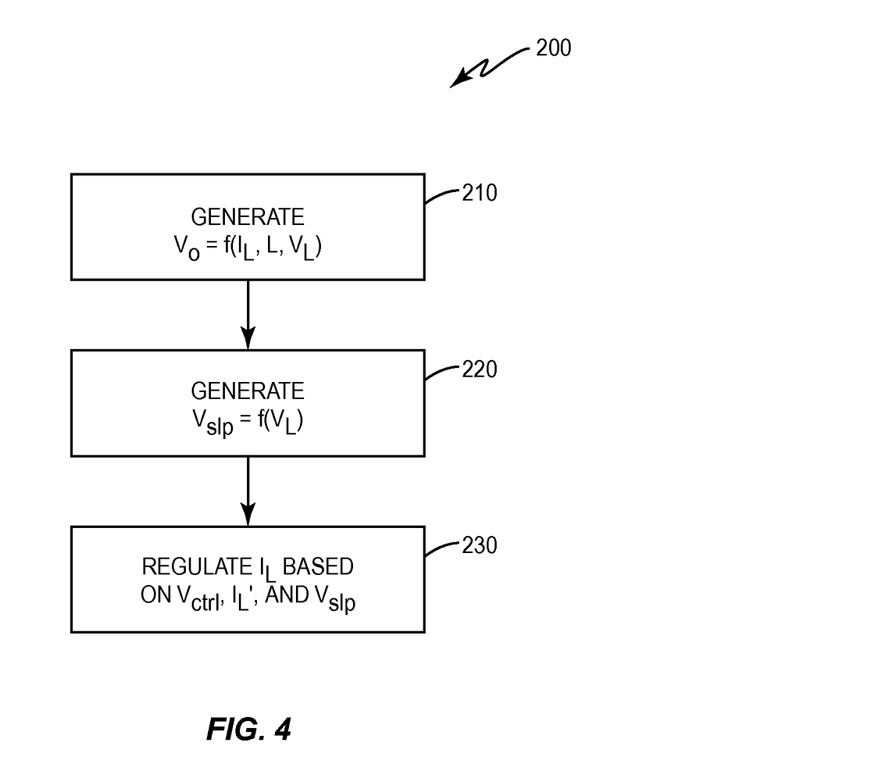
FIG. 4 shows a method of current-mode control according to one exemplary embodiment.

FIG. 4 shows an exemplary method 200 executed by the current-mode regulator 100 of FIG. 3. The current-mode regulator 100 generates an output voltage $V_o$ at an output end of the inductor and across a load 160 based on the inductor current $I_L$, the inductance L of the inductor, and an inductor voltage $V_L$ applied across the inductor (block 210). The slope circuit 120 generates a slope compensation voltage $V_{slp}$ based on a measurement of the inductor voltage $V_L$ (block 220). The inner current loop 180 regulates the inductor current $I_L$ based on a control voltage $V_{ctrl}$, an indirect measurement of the inductor current $I_L'$, which approximately represents the inductor voltage $V_L$, and the slope compensation voltage $V_{slp}$ (block 230).

Figure 5:
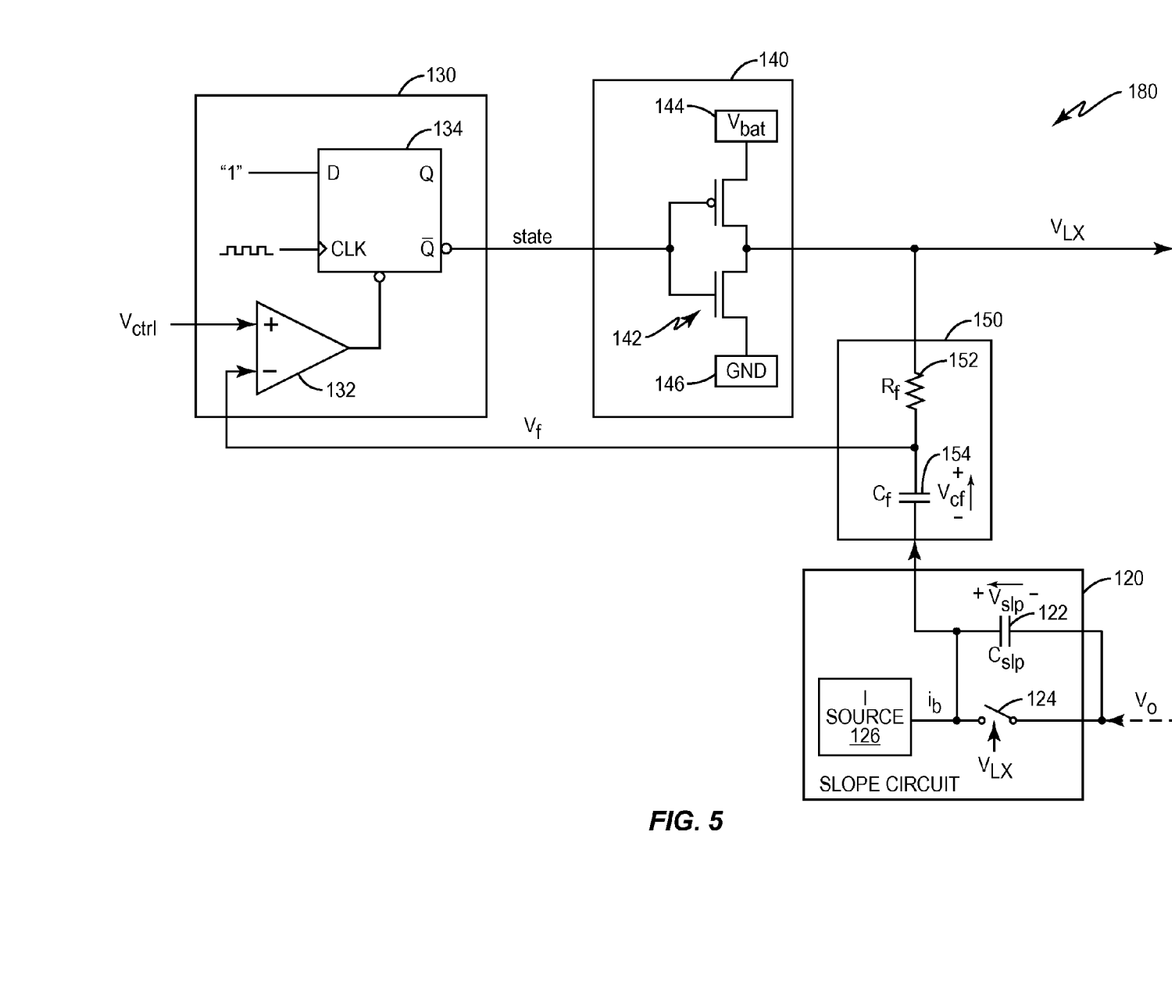
FIG. 5 shows a circuit diagram of an inner-loop control circuit according to one exemplary embodiment.

FIG. 5 shows circuit details for an exemplary implementation of the inner current loop 180. As shown in FIG. 5, the state decision circuit 130 comprises a comparator 132 and a switching controller 134. Comparator 132 compares the slope compensated measurement voltage $V_f$ to the control voltage $V_{ctrl}$. Responsive to the output of the comparator 132, the switching controller 134 generates a state signal, which is input to the switching network 140. The switching network 140 comprises a power bridge 142 of transistors connected on one end to the input voltage 144, e.g., $V_{bat}$, and on the other end to a second voltage 146, e.g., ground. Responsive to the state signal, the power bridge 142 selectively connects the input of the inductor 110 to the input voltage $V_{bat}$ 144 or ground 146.

FIG. 5 also shows circuit details for an exemplary current measurement circuit 150, which comprises a passive resistor-capacitor network. In the example of FIG. 5, the passive network comprises a resistor 152 coupled in series with a measurement capacitor 154, where a first end of the resistor 152 connects to the inductor input, a second end of the resistor 152 and a first end of the capacitor 154 connects to the comparator 132, and a second end of the capacitor 154 connects to the slope circuit 120. The slope compensated measurement voltage $V_f$ is provided from the node between the resistor 152 and the capacitor 154, where the voltage $V_{cf}$ across the capacitor $C_f$ represents the inductor voltage as measured by the current measurement circuit 150. While the passive network of FIG. 5 shows only one capacitor and one resistor, it will be appreciated multiple capacitors and/or multiple resistors may be used to form the resistance $R_f$ and capacitance $C_f$ of the passive network of the current measurement circuit 150.

Current measurement circuit 150 generates the slope compensated measurement voltage $V_f$ based on $R_f$, $C_f$, and $V_{slp}$. For example, the current measurement circuit 150 may generate the slope compensated measurement voltage $V_f$ by combining the output voltage $V_o$ and the slope compensation voltage $V_{slp}$ with the measured inductor voltage $V_{cf}$ according to:

$$V_f = \qquad\qquad (2)$$
$$V_{cf} + V_{slp} + V_o \approx \frac{(I_L - I_{LO})L}{R_f C_f} + \left[\frac{i_b}{C_{slp}} + \frac{V_{LX} - V_o}{R_f C_{slp}}\right](t - t_o) + R_L I_{LO},$$

where $I_{LO}$ represents the average output current applied to the load 160 by the inductor 110, and $I_L$ represents the instantaneous inductor current, and $t - t_o$ is the time used to generate the slope compensation voltage. Equation (2) shows that the changing part of the indirectly measured inductor current is represented with a gain, e.g., $L/R_f C_f$, while the fixed part is represented by $R_L I_{LO}$.

Figure 6:
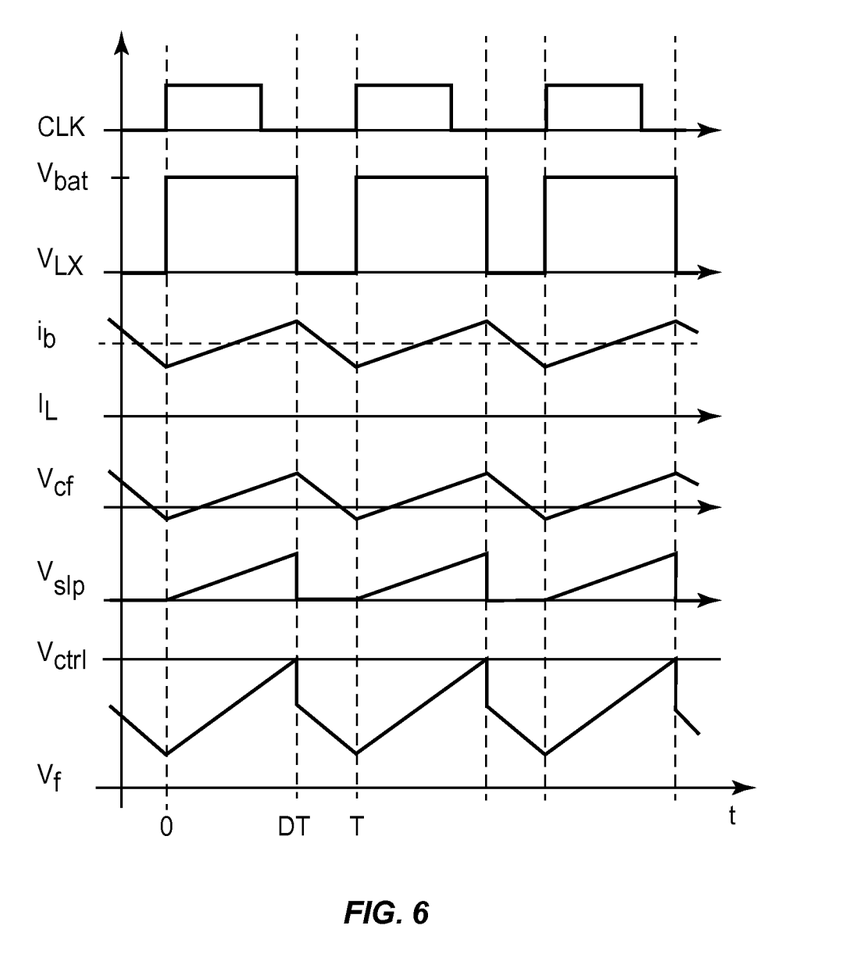
FIG. 6 shows an exemplary signal diagram for the current-mode regulator of FIGS. 3 and 5.

FIG. 6 shows a signal diagram for the main signals involved in the current-mode regulator 100 of FIGS. 3 and 5. At the rising edge of the clock signal clk, the switching controller 134 output signal ("state") has a value of 0, which results in $V_{LX} = V_{bat}$. Accordingly, switch 124 opens and the slope-compensation capacitor $C_{slp}$ 122 charges. The voltage $V_{slp}$ across the slope compensation capacitor 122 rises with the current source current $i_b$ and the rate of rise of the voltage across the slope compensation capacitor 122. The voltage $V_{cf}$ across the sensing capacitor 154 in the current measurement circuit rises with a slope proportional to the inductor current. Thus, the voltage $V_f$ output by the current measurement circuit 150 represents the inductor current (which is approximately equivalent to the measurement voltage $V_L$) plus an arbitrary positive slope provided by the slope circuit 120, which is designed to stabilize the current-mode regulator 100. When $V_f = V_{ctrl}$, the comparator 132 resets the switching controller 134, tying the output $V_{LX}$ of the power-bridge, and thus the inductor input, to ground, reducing the inductor current $I_L$. The switch 124 also closes to discharge the slope compensation capacitor 122. This process therefore regulates the inductor current.

The signal diagram of FIG. 6 is for a current-mode regulator 100 configured to operate in a peak mode, e.g., to regulate the peak (e.g., upper peak of the current ripple) of the inductor current. Such "peak" current-mode control is most suitable for duty cycles less than or equal to 50%. When the duty cycle exceeds 50%, the current-mode regulator 100 may be configured to operate in a valley mode, e.g., to regulate the valley (e.g., lower peak of the current ripple) of the inductor current. For example, switch 124 closes for the valley mode when the inductor input is tied to the input voltage, and opens when the inductor input is tied to ground. The modification for valley mode operations may be achieved, for example, by controlling switch 124 with the inverse of $V_{LX}$, e.g., $\overline{V}_{LX}$.

The indirect current measurement, and the associated slope compensation, provides many advantages over conventional current-mode control solutions. First, the current-mode regulator 100 disclosed herein provides improved efficiency because it uses indirect current measurement, and therefore, eliminates the need for direct current measurement circuitry inline with the inductor. The disclosed current-mode regulator 100 also requires significantly fewer components, and thus, much less silicon area to build. For example, the disclosed current-mode regulator 100 eliminates the need for a ramp generator. Further, the current-mode regulator 100 disclosed herein uses less bias current because it does not require a complex polarization scheme. The disclosed current-mode regulator 100 also does not require a complex internal calibration circuitry if proper output component selection is achieved, which may reduce the starting time and further reduces the required silicon area.

The amplifier and the comparator can be the same as that used by a voltage-mode controller (reuse-facility).

Various elements of the current-mode regulator 100 disclosed herein are described as some kind of circuit, e.g., a state decision circuit, a current measurement circuit, a slope compensation circuit, etc. Each of these circuits may be embodied in hardware and/or in software (including firmware, resident software, microcode, etc.) executed on a controller or processor, including an application specific integrated circuit (ASIC).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A current-mode regulator for a buck converter, the regulator comprising:
    a power inductor having an input and an output, and operative to deliver an output current from the power inductor output to a load;
    a switching network operative to selectively connect the power inductor input to an input voltage or a second voltage; and
    a controller operative to control the switching network, the controller comprising an inner loop control circuit comprising:
        the switching network;
        a current measuring circuit comprising a passive network connected to the power inductor input and operative to indicate a power inductor current as a measurement voltage;
        a slope circuit connected between the current measuring circuit and the output, the slope circuit operative to apply a time-varying voltage having a positive slope to the measurement voltage to generate a slope compensated measurement voltage;
        a comparator operative to compare the slope compensated measurement voltage to a control voltage; and
        a switching controller operative to control the switching network in response to the output of the comparator.

2. The regulator of claim 1 wherein the passive network comprises a resistor and a measurement capacitor.

3. The regulator of claim 2 wherein the slope circuit is connected in series with the current measuring circuit such that the series connection is in parallel with the power inductor.

4. The regulator of claim 3 wherein the slope circuit comprises a slope capacitor, and a switch connected in parallel with the slope capacitor and operative to selectively discharge the slope capacitor.

5. The regulator of claim 4 wherein the switch is controlled to charge the slope capacitor when the power inductor is connected to the input voltage, and to discharge the slope capacitor when the power inductor is connected to the second voltage.

6. The regulator of claim 4 wherein the slope circuit further comprises a current source coupled to the slope capacitor, said current source configured to inject additional current into the slope capacitor to increase the slope of the time-varying voltage when the power inductor is connected to the input voltage.

7. The regulator of claim 1 wherein the switching controller is operative to control the switching network to connect the power inductor to the input voltage at the rising edge of an applied clock signal, and is further operative to control the switching network to connect the power inductor to the second voltage when the slope compensated measurement voltage equals the control voltage.

8. The regulator of claim 1 wherein the controller further comprises a compensation circuit operative to generate the control voltage applied to the comparator based on a reference voltage.

9. A current-mode regulator for a buck converter, the current-mode regulator comprising:
    an inductor having an inductor current based on the inductance of the inductor and an inductor voltage applied across the inductor;
    an inner current loop circuit operatively connected to an input node of the inductor and an output node of the inductor, the inner current loop circuit configured to regulate the inductor current based on a control voltage, an indirect measurement of the inductor current, and a slope compensation voltage, the inner current loop comprising a slope circuit operatively connected to the output node of the inductor at an output of the current-mode regulator and configured to generate the slope compensation voltage based on the inductor voltage;
    wherein the slope circuit comprises:
        a slope capacitor operatively connected to the output node of the inductor and configured to generate the slope compensation voltage; and
        a switch operatively connected in parallel with the slope capacitor and configured to selectively actuate responsive to the inductor voltage such that:
            the switch closes when the inductor voltage is at a first voltage to discharge the slope capacitor; and
            the switch opens when the inductor voltage is at a second voltage different from the first voltage to charge the slope capacitor to generate the slope compensation voltage having a positive lope based on the capacitor.

10. The current-mode regulator of claim 9 wherein the inner current loop circuit comprises:
    a state decision circuit configured to generate a state logic signal based on the control voltage and a measured voltage;
    a power bridge circuit configured to generate an inductor input voltage at the input end of the inductor based on the state logic signal;
    a current measurement circuit comprising a resistor-capacitor network configured to indirectly measure the inductor current based on the inductor input voltage and the slope compensation voltage to generate the measured voltage applied to an input of the state decision circuit; and
    the slope circuit operatively connected between the output node of the inductor and an input to the current measurement circuit.

11. The current-mode regulator of claim 10 further comprising a compensation circuit operatively connected to the input of the state decision circuit, the compensation circuit configured to generate the control voltage based on an input reference voltage.

12. The current-mode regulator of claim 11 wherein the compensation circuit is further configured to generate the control voltage based on an output voltage at the output node.

13. The current-mode regulator of claim 11 wherein the compensation circuit, the state decision circuit, the power bridge circuit, and the inductor form an outer voltage loop for the buck converter.

14. The current-mode regulator of claim 9 wherein the slope circuit further comprises a current source coupled to the slope capacitor and configured to inject additional current into the slope capacitor to increase the slope of the slope compensation voltage such that the slope of the slope compensation voltage is derived based on the additional current and the slope capacitor when the switch is open.

15. The current-mode regulator of claim 9 wherein the inductor and inner current loop comprise one of a peak regulation circuit configured to operate responsive to the control voltage when a duty cycle of the buck converter is less than or equal to 50%, and a valley regulation circuit configured to operate responsive to the control voltage when a duty cycle of the buck converter is greater than or equal to 50%.

16. The current-mode regulator of claim 15 wherein for the peak regulation circuit, the switch opens when the second voltage is less than the first voltage, and wherein for the valley regulation circuit, the switch opens when the second voltage is greater than the first voltage.

17. The current-mode regulator of claim 10 wherein the current-mode regulator is configured to operate responsive to at least one of the control voltage and one or more operating conditions when the duty cycle of the buck converter is greater than or equal to 50% and when the duty cycle of the buck converter is less than 50%.

18. A method of controlling a buck converter using current-mode control, the current-mode control regulating an inductor current of an inductor, the method comprising:
generating an output voltage at an output end of the inductor based on the inductor current, the inductance of the inductor, and an inductor voltage applied across the inductor;
generating a slope compensation voltage based on the inductor voltage; and
regulating the inductor current based on a control voltage, an indirect measurement of the inductor current, and the slope compensation voltage;
wherein generating the slope compensation voltage comprises:
closing a switch operatively connected in parallel with a slope compensation capacitor when the inductor voltage is at a first voltage to discharge the slope capacitor; and
opening the switch when the inductor voltage is at a second voltage different from the first voltage to charge the slope capacitor to generate the slope compensation voltage having a slope based on the slope capacitor.

19. The method of claim 18 wherein opening the switch to generate the slope compensation voltage based on the slope capacitor comprises opening the switch to generate the slope compensation voltage based on the slope capacitor and the indirect measurement of the inductor current.

20. The method of claim 18 wherein regulating the inductor current comprises:
generating a state logic signal based on the control voltage and a measured voltage;
generating an inductor input voltage at an input end of the inductor based on the state logic signal;
indirectly measuring the inductor current, using a resistor-capacitor network, based on the inductor input voltage;
generating the measured voltage based on the indirectly measured inductor current and the slope compensation voltage;
regulating the inductor current based on the control voltage and the measured voltage.

21. The method of claim 18 further comprising generating the control voltage based on an input reference voltage.

22. The method of claim 21 wherein generating the control voltage based on the input reference voltage comprises generating the control voltage based on the input reference voltage and the output voltage.

23. The method of claim 18 further comprising injecting additional current from a current source into the slope capacitor to increase the slope of the slope compensation voltage such that the slope of the slope compensation voltage is derived based on the additional current and the slope capacitor when the switch is open.

24. The method of claim 18 wherein the current-mode control comprises at least one of a peak current-mode control configured to operate when a duty cycle of the buck converter is less than 50%, and a valley current-mode control configured to operate when a duty cycle of the buck converter exceeds 50%.

25. The method of claim 18 wherein the current-mode control is configured to operate when the duty cycle of the buck converter exceeds 50% and when the duty cycle of the buck converter is less than 50%.

* * * * *